United States Patent
Ma et al.

[11] Patent Number: 5,960,201
[45] Date of Patent: *Sep. 28, 1999

[54] NUMERIC INTENSIVE DEVELOPMENT ENVIRONMENT

[75] Inventors: Wei Ma; Kiak Wei Khoo, both of Singapore, Singapore

[73] Assignee: Tritech Microelectronics, Ltd, Singapore, Singapore

[*] Notice: This patent is subject to a terminal disclaimer.

[21] Appl. No.: 08/820,466

[22] Filed: Mar. 17, 1997

[51] Int. Cl.[6] ..................................................... G06F 9/44
[52] U.S. Cl. ........................ 395/705; 395/701; 395/702; 395/710; 395/704; 395/500.44; 714/38; 714/46; 712/300; 712/208
[58] Field of Search ..................................... 395/701, 704, 395/705, 707, 708, 710, 500, 384, 385, 562, 566, 898, 702, 500.44; 714/33, 38, 46, 47; 712/208, 209, 221, 225, 300

[56] References Cited

U.S. PATENT DOCUMENTS

| | | | |
|---|---|---|---|
| 5,247,668 | 9/1993 | Smith et al. | 395/600 |
| 5,265,254 | 11/1993 | Blasciak et al. | 395/704 |
| 5,283,900 | 2/1994 | Frankel et al. | 395/670 |
| 5,375,228 | 12/1994 | Leary et al. | 395/575 |
| 5,392,448 | 2/1995 | Frankel et al. | 395/800.35 |
| 5,450,586 | 9/1995 | Kuzara et al. | 395/704 |
| 5,724,272 | 3/1998 | Mitchell et al. | 395/764 |

OTHER PUBLICATIONS

"MWAVE" from the IBM Internet (IBM.COM) Contains 5 pages.
Powell et al., "Direct Synthesis of Optimized DSP Assembly Code from Signal Flow Block Diagrams," IEEE International Conference on Acoustics, Speech, and Signal Processing, ICASSP–92, vol. 5, pp. 553–556, Mar. 1992.

*Primary Examiner*—Tariq R. Hafiz
*Assistant Examiner*—Tuan Q. Dam
*Attorney, Agent, or Firm*—George O. Saile; Stephen B. Ackerman

[57] ABSTRACT

This invention describes a numeric intensive development environment for producing code for various fixed point DSP's and providing a debug capability that assists the user by displaying various data from the DSP in various formats. The DSP code is created in a DSP-C language which is based on low level assembly language tools enhanced with extensive native mathematical representation formats and high level language syntax. This provides the advantage of handling numeric representation in high level language and optimizing the code for speed and compactness in low level language. Once the code is created in DSP-C it can be connected to a DSP through a driver and driver interface. The driver interface allows the code to be universal with a different driver being used to connect the code to different DSP's. In debug mode data from a target DSP is continuously fetched allowing the user to make real time modifications to the code and get real time feed back of the results.

18 Claims, 5 Drawing Sheets

NUMERIC INTENSIVE DEVELOPMENT ENVIRONMENT

Related patent application, Ser. No. 08/823,528, Filing Date Mar. 24, 1997.

BACKGROUND OF THE INVENTION

1. Field of Invention

This invention relates to a code development environment for digital signal processors (DSP) and in particular fixed point DSP's for the ease of code development and debug, and for porting the code to other brands and types of digital signal processors.

2. Description of Related Art

There are several existing code development tools that are available for particular brands or types of DSP's. The problem is that if one needs to port the code to a different DSP it entails a considerable rewrite to adjust to the different architecture. Coupled with this is the need to translate digital formats during code development and debug. This is particular acute for a fixed point DSP that is dealing with floating point operations and usually requires tedious time consuming conversions during debug using a hand calculator or the equivalent to check whether the correct data is being generated. In addition code developed in DSP assembly language is time consuming and using a higher level language like C programming language for a fixed point DSP can create problems because of inconsistent code optimization and truncation error.

Referring to U.S. Pat. No. 5,247,668 (Smith et al.) a compiler is used to develop code for a specific DSP application. Whereas the techniques in this invention could be applicable elsewhere, it is not readily available to create code for other DSP applications without considerable rework and restructuring. In U.S. Pat. No. 5,375,228 (Leary et al.) is described an emulation system to debug software for a DSP. This is an application dependent configuration which integrates a digital signal analyzer into a specific DSP emulation system.

Commercial vendors for DSP products, such as IBM with their Mwave DSP, provide development tool kits for programming and debug of application software to run their DSP. The tool kit allows programming in C language or in assembly language, and real time debugging with data being displayed on the computer system monitor. As with other vendors, this tool kit does not provide the capability to easily port code for use with other types and makes of DSP's.

Existing development tools are available for a single type DSP and do not provide a universal capability that can easily produce code for various DSP types and brands. Thus the porting of code to other brand of DSP entails a considerable rewrite and additional debug. Working with fixed point DSP's requires a considerable amount of effort in the debug phase to manually convert to other numerical formats which are more appropriate by using hand calculators or equivalent. Determining the floating point, decimal and thirty-two bit formats from an integer DSP is equally a chore especially when converting code for another type DSP that is not being done by the original programmer. For situations where various types and brands of DSP are being used, there is a need for a universal programming environment which allows for easy debug and porting of code.

SUMMARY OF THE INVENTION

This invention describes a numeric intensive development environment (NIDE) for the development and debug of code for digital signal processors (DSP). Digital signal processors are fast becoming a generic math engine and are proliferating into many areas, far beyond the traditional filtering applications. Implementing complicated math algorithms in low cost fixed-point DSP's has become one of the biggest challenge in DSP software development. A NIDE as described herein provides a new concept in DSP software development that can significantly improve the efficiency of numeric intensive real-time software development.

There are currently two common approaches in developing DSP software. One is to use high level language (HLL) tools, such as C-language. Numerous C compilers can deal well with numeric behaviors but are not as efficient in real-time code-generation as well as memory usage. The second approach is to use low level language (LLL) tools, such as assembly language. The LLL can handle real-time behaviors and achieved the most optimized implementation, but has difficulty handling numeric behaviors that in turn cause a long development time.

Recently, there has been considerable effort focused on adding more real-time control tools to HLL compilers. These make the HLL compiler very complicated, and yield little improvement to new algorithms since the optimizations are still based on prior knowledge of the original code. Therefore, a lot of embedded applications are still developed by using assembly languages. Numeric software bugs are normally manifested through inaccuracy in numeric analysis or large scale collective analysis, such as LMS, waveform, and spectrum analysis, and the debugging involves large amounts of mathematical analysis, including the conversion from one data format to another. Also most tools provide only two or three formats, such as binary, decimal and hexadecimal digits. This makes the debugging process extremely difficult in a fixed-point implementation.

The NIDE is designed to solve the problems with LLL tools. It is based on LLL tools with extensive native mathematical representation formats and HLL syntax. This combination of LLL tools and HLL syntax is called DSP-C. It possesses both the advantages of handling numeric mathematics in HLL and optimization for code speed and compactness in LLL. Moreover, the NIDE is generic for all DSP's and microprocessors. When the target processor is changed, only the low level development tools and drivers need to change. The numeric intensive interface still remains universal, and the NIDE supports all data formats such as fixed point M_N (M digits of Integer and N digits of fractional) and floating point M_E (M digits of mantissa and E digits of exponent). All math utilities are focused on low level native DSP environment and on-line performance. Debugging DSP software though NIDE is made easy because all data in the physical hardware has been converted into native mathematics representation and displayed on a computer screen.

The code developed in the NIDE is coupled to a hardware DSP through a set of drivers and a physical interface. The drivers are unique to each different type of DSP and provide a means by which the same code can be used to operate different DSP's. Thus a single programming effort can be used for different brands and types of DSP's. The physical interface can be either a serial or parallel port; or the DSP hardware can be internally attached through a system bus.

The NIDE senses the type of DSP that is connected to the computer system through the physical interface. This is accomplished by detecting different characteristics of the DSP, such as memory size, register size, type and location, and physical setting such as with a jumper. When the type DSP has been determined, the appropriate driver is selected to connect the developed code to the DSP which is attached to the computing system containing the programming environment. If no DSP is detected, the programming environment will operate in simulation mode. When in simulation mode the assembly language library functions are used to do the simulation, following the behavior of the hardware architecture and producing the simulation the same as in real mode.

A DSP connected through a set of drivers to the computing system is continuously sampled and the resulting data displayed on the computer screen. This provides the user capability of viewing the responses in real time and making changes to correct problems and optimize the operation of the DSP. One of the main features of this invention is the ability to assist in the debug and optimization of the developed DSP code. Through a user interface the development environment displays various data from the DSP on the computer monitor. The data is continuously fetched from the DSP allowing the user to make changes and immediately observe the results. The data can be displayed in different mathematical formats and changed readily by the user to produce a wide range of different mathematical representations of the integer format within the DSP. There is capability to convert the fixed point data into various decimal, hexadecimal and floating point formats, as well as being able to change between big and little endian formats. Through a graphical user interface the user points and clicks with the computer mouse to chose the desired format for the particular displayed data. Converting to other formats during debug is easy and convenient, and saves many long tedious hours of computation.

BRIEF DESCRIPTION OF THE DRAWINGS

This invention will be described with reference to the accompanying drawings, wherein.

DETAILED DESCRIPTION OF THE PREFERRED EMBODIMENT

Figure 1:
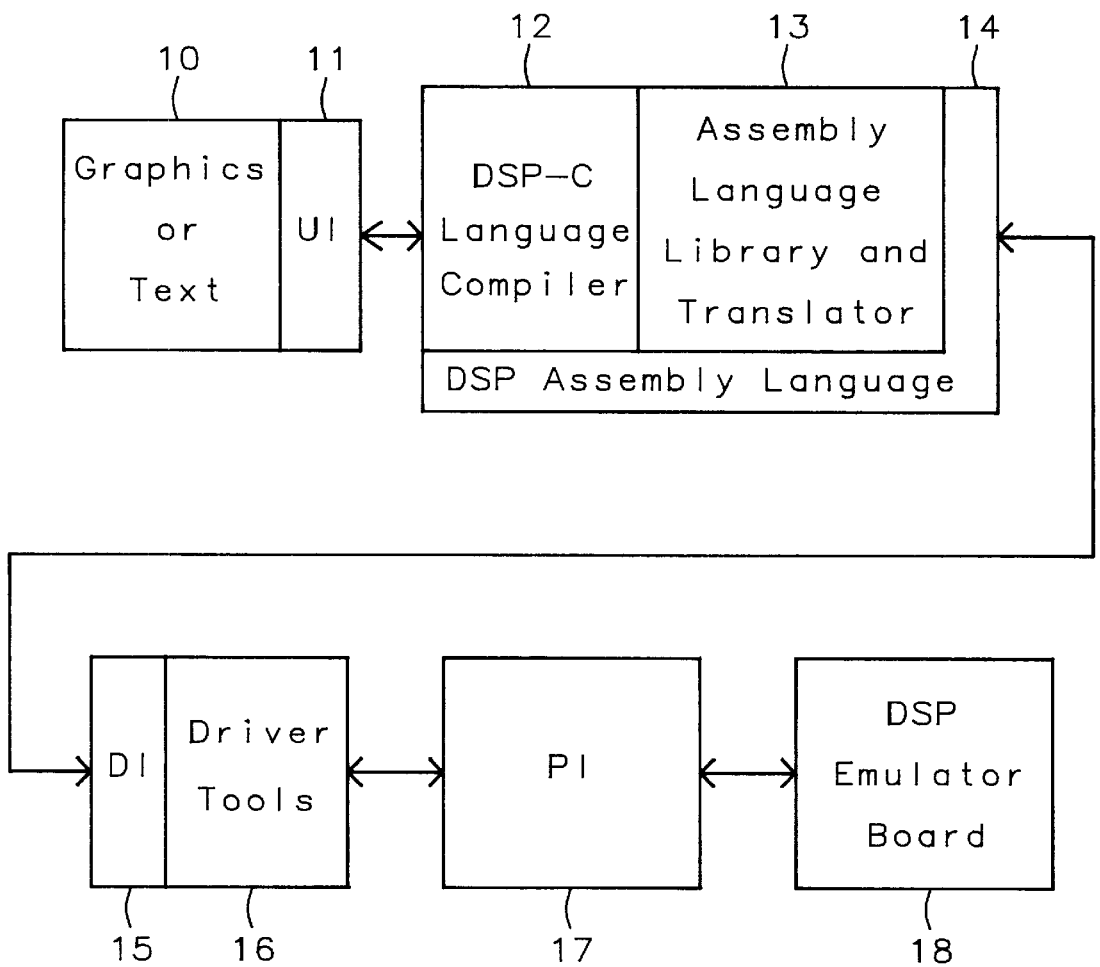
FIG. 1 is an overview of the numeric intensive integrated development environment system.

A numeric intensive development environment (NIDE) for DSP code development is shown in FIG. 1. A user is connected to a computer system by means of graphics or text 10 through a user interface 11. The user interface 11 is a Windows GUI (graphical user interface) that provides a user friendly interface familiar to many programmers and users. The user interface 11 allows the user to connect to programming development environment where code can be developed in DSP assembly language 14 or DSP-C language 12. Various data from the development system is displayed through the user interface 11. By means of pointing and clicking with a computer mouse the user can select from the user interface 11 various data from the programming development environment including representation of the data in various formats, such as decimal, hexadecimal, big and little endian, and different combinations of the exponent and mantissa. This capability of the user interface 11 to display data in different formats is particularly useful in debugging code for a fixed point DSP where many tedious manual translations would otherwise be required to determine if the right floating point formats were being used.

The development of the code for a DSP centers around producing code by programming in assembly language 14, or through use of DSP-C 12. The DSP-C language 12 is assembly language augmented with extensive native mathematical representation formats and high level C language syntax. The use of a C language syntax is preferred because it is more readable, easier to understand and familiar to most programmers than programming directly in DSP assembly language 14. Once code has been written and compiled in DSP-C 12, it is translated line by line to DSP assembly language 14 using the assembly language library translator 13.

A driver interface 15 connects the DSP assembly language code 14 to a set of driver tools 16 which contains a unique driver for each different type DSP that can be connected to the system. The driver tools 16 provide the means by which various code that is written for one type and manufacturer of a DSP can be easily ported to another type and manufacture of a DSP. This is accomplished through a single common driver interface 15. The DSP assembly language code 14 is developed to the driver interface 15, and the driver tools 16 provide the necessary translations for the architecture of the different types and manufacturer of the various DSP's that can be used with the development environment.

The driver tools 16 connect the code to a DSP and associated hardware 18 through a physical interface 17. This physical interface 17 can be either internal or external to the host computing system, where the internal interface is an internal bus and the external interfaces either a parallel or serial port to the computing system. Often the DSP and related hardware is an emulator board 18 created in the early phases of DSP product development.

The system detects the type of DSP 18 connected to the computer by detecting various characteristics of the DSP 18 such as register type, size and location, memory size, physical jumpers and the likes. When the type of DSP 18 is determined, the appropriate driver 16 is automatically invoked. If a different type DSP 18 is next connected to the computer system, the DSP type is detected, a new driver is selected from the driver tools 16 and the DSP program 14 is re-linked to the new DSP 18. If a DSP 18 is not detected, the system runs in simulation mode. When in simulation mode, library functions 13 are used to follow the behavior of the hardware architecture allowing the simulation to behave the same as in real time mode.

Continuing to refer to FIG. 1, the computer system continuously fetches data from the DSP 18 for display to the user by the user interface 11. This data can be presented to the user in different formats determined by the user's choice through pointing and clicking the computer system mouse. This allows the user to debug or fine tune the code 12 and 14 while watching the resulting data from the DSP 18. The DSP program memory can be displayed in various formats for program debug by selection of the computer mouse. The various formats include but are not limited to disassembled format, floating point, decimal and hexadecimal as well as big and little endian formats. Also a computational register window can be opened through the user interface 11 in which the format of a register can be selected to be displayed in different formats by scrolling with use of the computer mouse.

Figure 2:
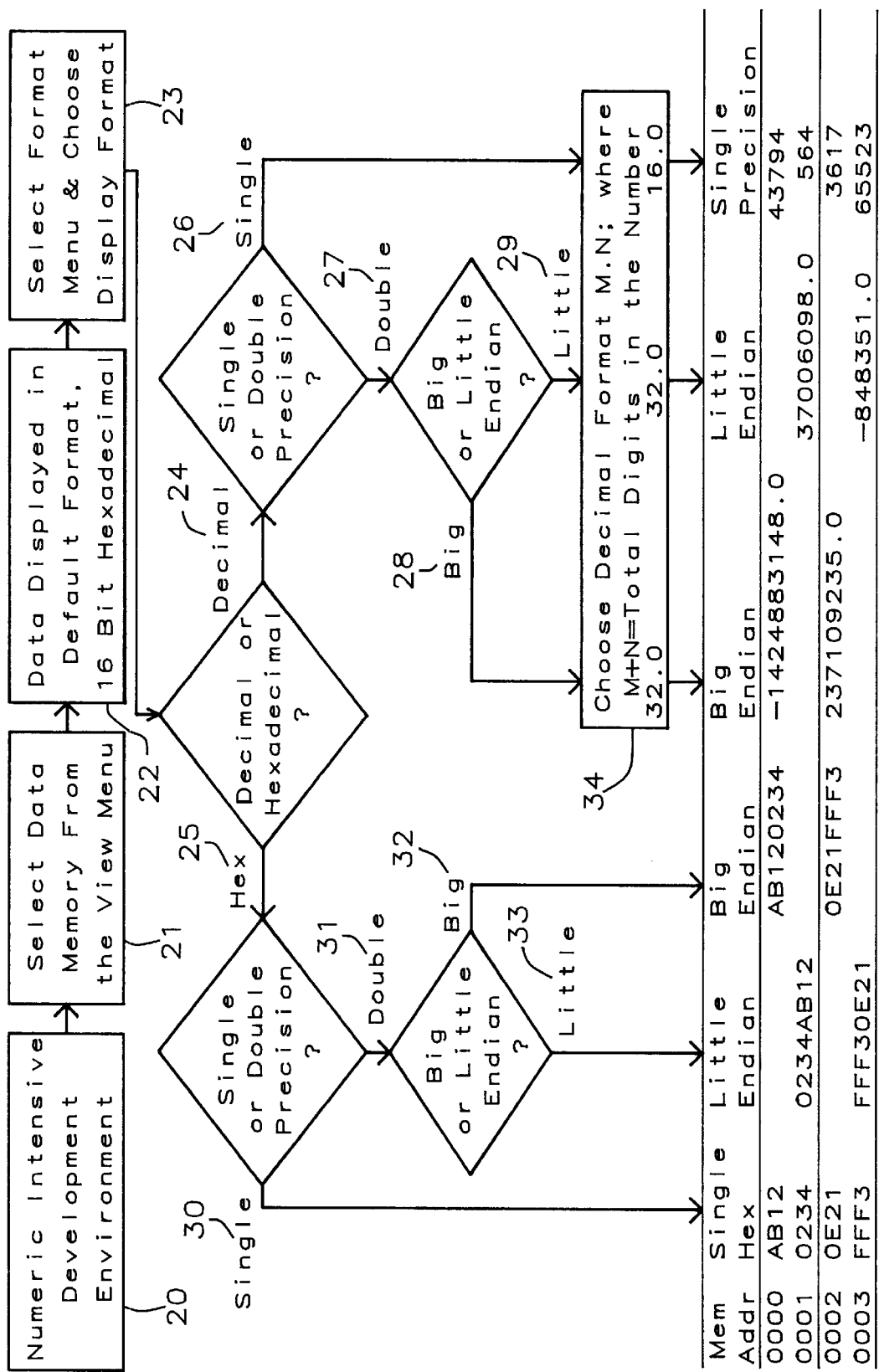
FIG. 2 is a diagram for selection of decimal and hexadecimal formats.

In FIG. 2 is shown the NIDE selection process for display of the DSP 18 memory in various decimal and hexadecimal formats through the user interface 11 shown in FIG. 1. While viewing the numeric intensive development environment 20 through the user interface 11, the user selects data memory from the view menu 21. DSP memory data is displayed in a default hexadecimal format 22. If the default format 22 does not suit the user's needs, then additional data formats can be selected by selecting format menu and choosing display format 23. This opens up several format choices including decimal 24 and hexadecimal 25. Under decimal 24 further format choices can be made by choosing single precision 26 or double precision 27, big endian 28 or little endian 29. Within the hexadecimal format 25 choices are also single precision 30 and double precision 31, and big endian 32 and little endian 33. Little endian 33 and big endian 32 are format choices for combining two-sixteen bit numbers to create a thirty two bit number. The thirty two bit number is stored in two consecutive sixteen bit DSP memory locations, for example; memory locations (0000) and (0001) as shown in FIG. 2. Stored in these two memory locations is two single precision words, shown as two hexadecimal numbers (AB12) and (0234). Little endian format 33 takes the lower order data (0234) from the sixteen bit memory address (0001) of the DSP 18 and concatenates to it with the higher order data (AB12) from the memory address (0000). The double precision little endian results (0234AB12) are displayed on the computer screen along with the memory address (0001) of the lower order data of the DSP 18 which is associated with the higher order bytes of the little endian number. Big endian format 32 concatenates the data (0234) stored in the DSP memory location (0001) to the data (AB12) stored in memory location (0000). Thus forming the big endian format word (AB120234) which is displayed on the computer screen along with the memory location (0000) associated with the high order two bytes of the big endian format. Other DSP 18 data, such as register data, can also be converted to the various hexadecimal formats in similar manner. Since these do not carry a memory address identifier, an decision must be made relative to which field contains low order and high order data.

Continuing to refer to FIG. 2, the decimal formatted data can be displayed on the computer screen in either single 26 or double 27 precision decimal format. The double precision format 27 can be further displayed in either little endian 29 or big endian 28. The decimal format 34 can be displayed in a full range of combinations of integer (M) and Decimal (N) digits forming the decimal (M_N). Thus double precision thirty two bit data can have a format ranging from thirty two bits of integer and no bits of decimal, as shown in FIG. 2, through all intermediate combinations to thirty two bits of decimal and no bits of integer. Similarly, the single precision, sixteen bit integer can be displayed in a full range integer and decimal digits. Shown in FIG. 2 is the format M=32 and N=0 for the double precision data and M=16 and N=0 for the single precision data. This decimal data is the equivalent of the hexadecimal data 25 and is associated with the appropriate DSP memory location, as shown in FIG. 2, when displayed on the computer screen.

Figure 3:
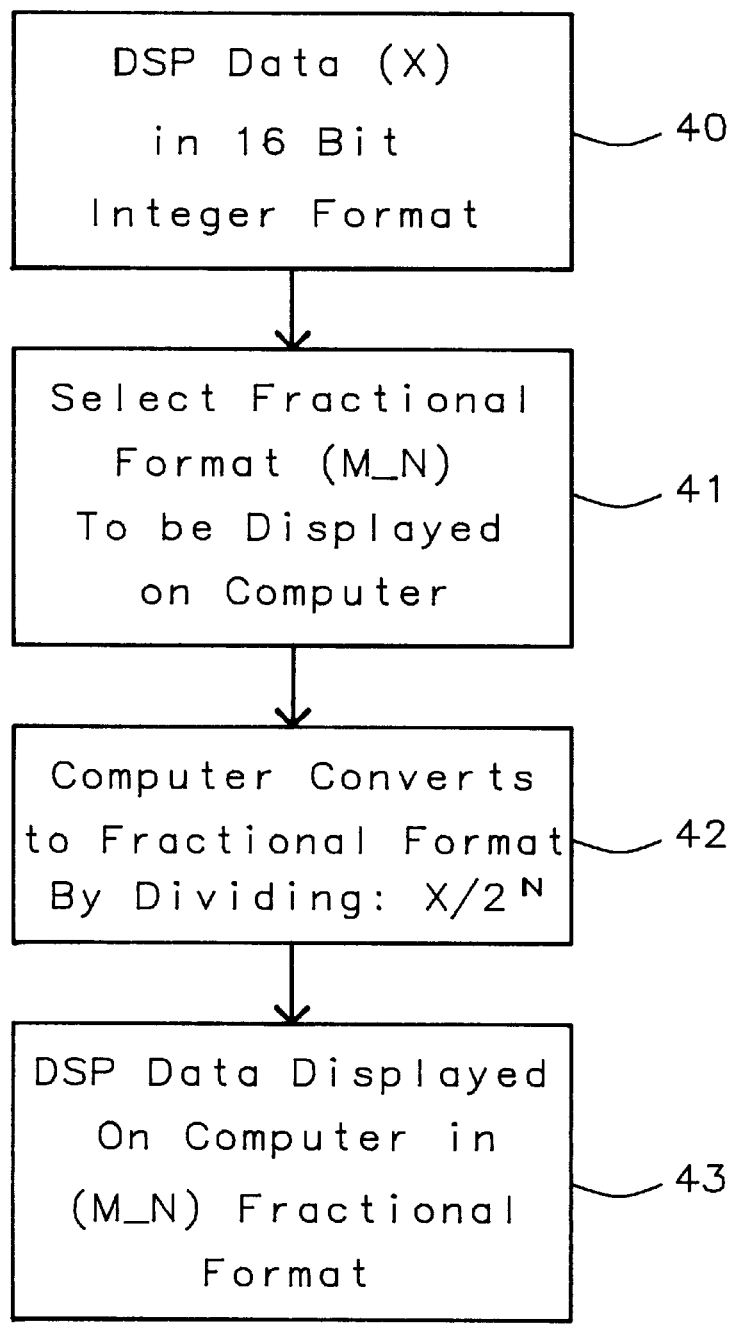
FIG. 3 is a diagram for computing a fractional format.

Referring to FIG. 3, the DSP sixteen bit integer data 40 (noted as X) is converted to a selected fractional format (M_N) 41 for display to the user on the computer screen. The M represents the number of bits of integer data, and the N represents the number of bits of decimal data that is to be converted. The conversion to decimal 42 is accomplished by the NIDE (numerical intensive development environment) by dividing the appropriate DSP 18 data by the Nth power of two, or $X/2^N$ where X is the DSP 16 bit integer data 40. All combinations of M integer data and N fractional data is available from the NIDE, ranging from M=32 and N=0 to M=0 and N=32, and providing a full range from all integer to all decimal and all combinations in between.

Figure 4:
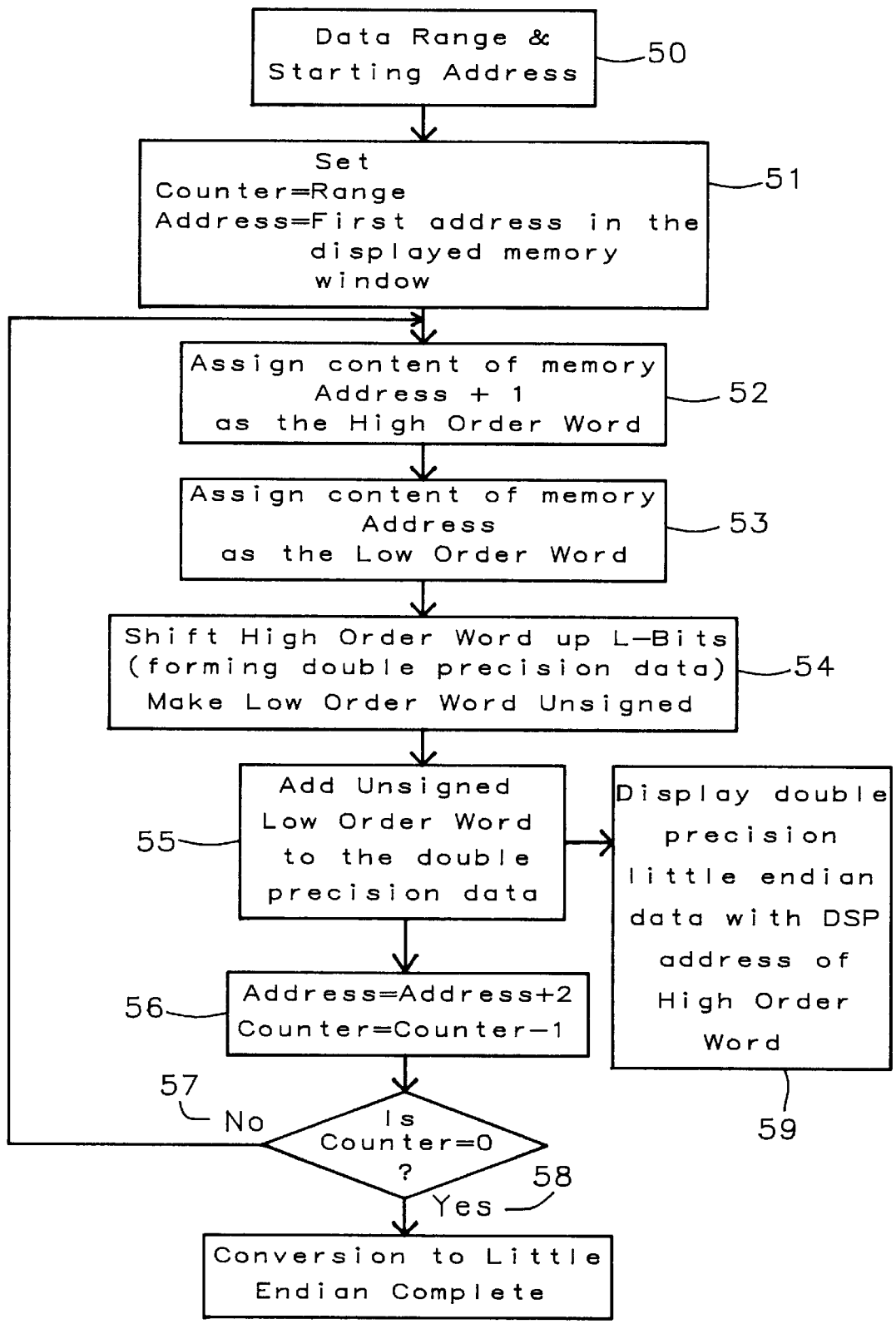
FIG. 4 is a diagram showing the procedure for converting to little endian format.

In FIG. 4 is the method used in the NIDE to convert a range of word data into two word, double precision little endian format for display to the user, where a word is the content data (8-bit, 16-bit, 24-bit, etc.) of a single unique memory address. A double precision little endian format is made up of two word segments. The two word segments are from data stored in two contiguous locations in the DSP memory located on the DSP emulator board 18 in FIG. 1. The first segment comes from the low-order word segment of DSP memory 18 and the second comes from the high order word segment of DSP memory 18. The high order word is stored in the next address of the current address in DSP memory and the low order word in the current address in DSP memory. Given a starting address and the range of the data to be converted 50, both a DSP memory starting address and a program counter are set 51. The content of the starting address is assigned as the low order word 53, and the content of the next address is assigned as the high order word 52. The high order word is shifted up L-bit of the double precision word size, where the L-bit is the word-size of the single precision word (16-bit, 24-bit, etc.); and the low order word is made to be unsigned 54. The unsigned low order word is added to the shifted high order word 55 to form a double precision little endian formatted word. Thus the low order word is concatenated to the high order word. The double precision little endian word along with the DSP address of the high order word is sent to the computer display 59 for viewing by the user. The address pointer is indexed by two and the count in the program counter is reduced by one 56. If the program counter is not zero 57, then another double precision little endian word is created from the data in the next two DSP memory locations by going through process steps 52, 53, 54, 55, 56 and 59. When the program counter reaches zero 58, the process is completed. This conversion can also be easily extended into multiple word precision, which combines a number of contiguous words (more than two words) in physical memory locations into a single logical number for display to the user.

Figure 5:
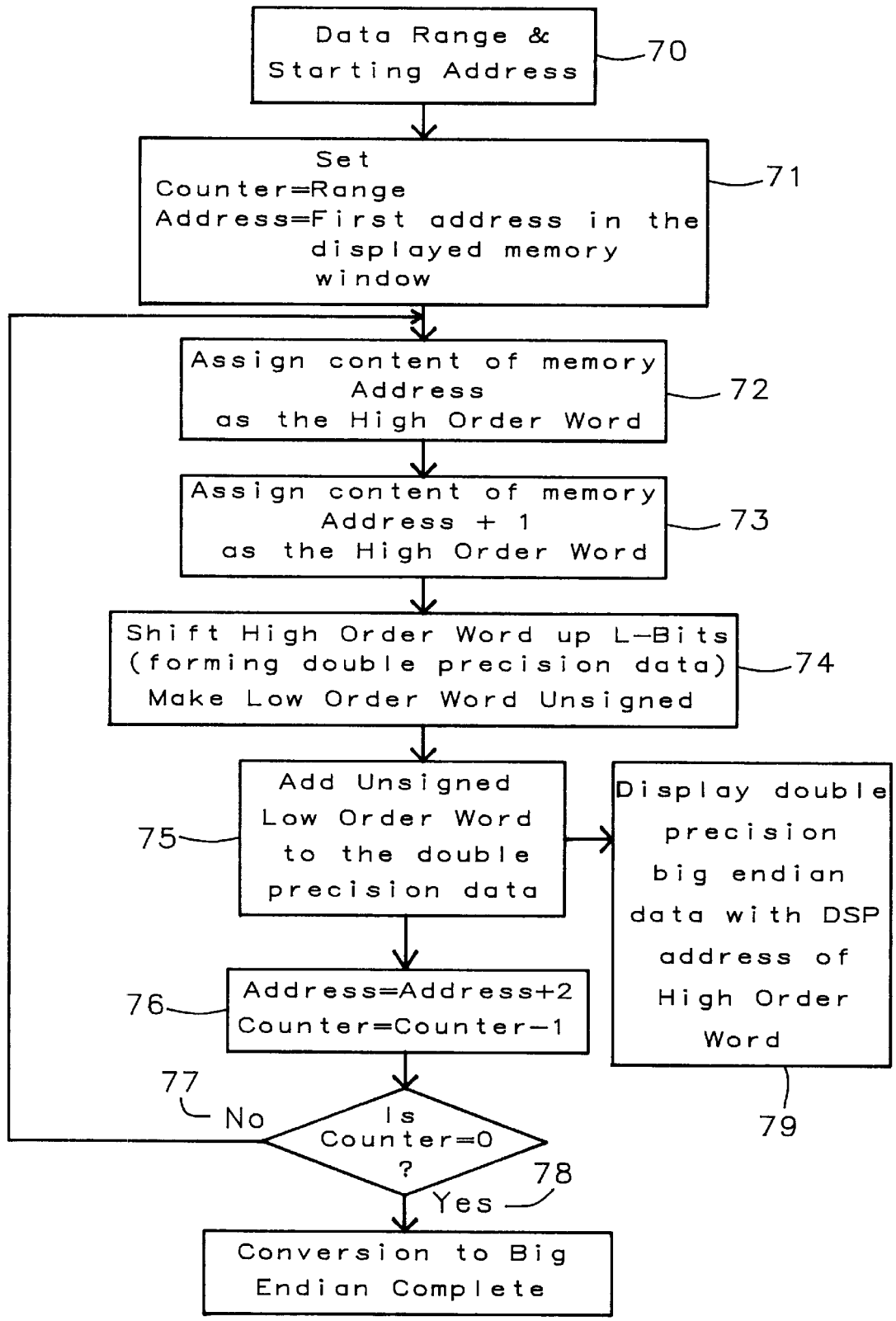
FIG. 5 is a diagram showing the procedure for converting to big endian format.

In FIG. 5 is shown the method used in the NIDE to convert a range of word data into a two word, double precision big endian format for display to the user, where a word is the content data (8-bit, 16-bit, 24-bit, etc.) of a single unique memory address. A double precision big endian format is made up from two-word segments. The two word segments are from data stored in two contiguous locations in the DSP memory located on the DSP emulator board 18 in FIG. 1. The first segment comes from the high order word segment of DSP memory 18 and the second comes from the low order word segment of DSP memory 18. The low order word is stored in the next address of the current address in DSP memory and the high order word in the current address in DSP memory. Given a starting address and the range of the data to be converted 70, both a DSP memory starting address and a program counter are set 71. The content of the starting address is assigned as the high word 73, and the content of the next address is assigned as the low order word 72. The high order word is shifted up L-bit of the double precision word size, where the L-bit is the word-size of the single precision word (16-bit, 24-bit, etc.); and the low order word is made to be unsigned 74. The unsigned low order word is added to the shifted high order word 75 to form a double precision big endian formatted word. Thus the low order word is concatenated to the high order word. The double precision big endian word along with the DSP address of the high order word is sent to the computer display 79 for viewing by the user. The address pointer is indexed by two and the count in the program counter is reduced by one 76. If the program counter is not zero 77, then another double precision big endian word is created from the data in the next two DSP memory locations by going through process steps 72, 73, 74, 75, 76 and 79. When the program counter reaches zero 78, the process is completed. This conversion can also be easily extended into multiple word precision, which combines a number of contiguous words (more than two words) in physical memory locations into a single logical number for display to the user.

While the invention has been particularly shown and described with reference to preferred embodiments thereof, it will be understood by those skilled in the art that various changes in form and details may be made without departing from the spirit and scope of the invention.

What is claimed is:

1. A numeric intensive development environment for digital signal processor (DSP) code development, comprising:
    a) a computing system for code generation containing a user interface, a DSP-C language compiler coupled to a DSP assembly language library translator and DSP assembly language for generating an enhanced assembly language code which is based on a low level assembly language tools enhanced with extensive native mathematical representation formats and high level language syntax, driver tools and a driver interface,
    b) said computing system connected to a DSP and associated hardware,
    c) said user interface providing a text or graphics interface between a user and said generated enhanced assembly language code for handling various numeric data formats and producing efficient code,
    d) said generated enhanced assembly language code connected to a set of driver tools by means of the driver interface,
    e) said driver tools connecting to said DSP hardware through a physical interface so that the high level language syntax portion of said generated enhanced assembly language code still remains universal for all type of DSP's, and
    f) said physical interface being either a parallel or serial connection depending on the requirements of the associated hardware.

2. The numeric intensive development environment of claim 1, wherein part or all of the code necessary to run the DSP can be developed in DSP-C language and converted to digital signal processor assembly language by the DSP assembly language library translator.

3. The numeric intensive integrated development environment of claim 1, wherein part or all the code necessary to run the digital signal processor can be developed in the DSP assembly language.

4. The numeric intensive development environment of claim 1, wherein the DSP hardware can be a DSP emulator board.

5. The numeric intensive development environment of claim 1, wherein the DSP hardware is physically attached internally to the computing system through an internal bus.

6. The numeric intensive development environment of claim 1, wherein real time tuning and modifications can be made to the code, and comprising:

a) continuous fetching of data from the digital signal processor by the computer system,
    b) displaying of the digital signal processor operational response and data through the user interface,
    c) changing the code in real time to tune and make modifications,
    d) connecting the changes to the DSP hardware through the driver and physical interfaces,
    e) monitoring the effects of the changes through the continuous fetching of data from the DSP.

7. A digital signal processor (DSP) code development system that is independent of the type digital signal processor being used, comprising:
    a) a computing system connected to a digital signal processor and associated hardware,
    b) said computing system containing a DSP-C language compiler, a DSP assembly language library translator and DSP assembly language for generating an enhanced assembly language code which is based on a low level assembly language tools with extensive native mathematical representation formats and high level language syntax,
    c) code created and optimized by use of the DSP-C language compiler,
    d) said enhanced assembly language code being generated by converting each line of the results of the DSP-C language compiler to assembly language by the DSP assembly language library translator,
    e) a set of software drivers interface the enhanced assembly language code to the digital signal processor,
    f) detection by the computing system of the type of digital signal processor being used in the DSP hardware by requesting an identification signal, and
    g) the computing system selecting a particular set of drivers upon identification of the type DSP being used.

8. The DSP code development system of claim 7, wherein a single program can be ported to other types of digital signal processors by using an appropriate driver.

9. The DSP code development system of claim 7, wherein no digital signal processor hardware is detected, and comprising:
    a) operating computing system in simulator mode,
    b) selecting a target digital signal processor to select a driver,
    c) programming in DSP-C language,
    d) using assembly language library functions to simulate behavior of the digital signal processor architecture.

10. The DSP code development system of claim 7, wherein the identification signal of the digital signal processor can be register size, type and location memory size and physical jumpers.

11. The DSP code development system of claim 7, wherein the digital signal processor response is continuously monitored allowing real time corrections to the code.

12. The DSP code development system of claim 7, wherein a portion of the code can be written in assembly language.

13. A numeric intensive code development environment providing format conversion of numerical data for display on a computing system monitor, comprising:
    a) a computing system containing a DSP-C language compiler, a DSP assembly language library translator and DSP assembly language for generating assembly language augmented with extensive native mathematical representation formats and high level language syntax code development software, b) said computing system connected to a fixed point digital signal processor and associated hardware by means of software drivers and a physical interface, c) various data of the fixed point DSP being digitally displayed on the computing system monitor, d) said data represented by multiple bytes of DSP data, e) said multiple bytes displayed in different digital formats, and f) said different formats being activated by pointing and clicking a computer mouse on the appropriate displayed menu data.

14. The numeric intensive code development environment of claim 13, wherein the DSP data is displayed on the computing system monitor and can be in a digital format different than actual arrangement of bytes in the digital signal processor, and comprising:

a) providing various format options to be chosen by a user, b) displaying format options upon command by user, c) converting DSP fixed point data into different formats upon selection by user, d) displaying converted DSP fixed point data on the computing system monitor.

15. The numeric intensive code development environment of claim 14, wherein said DSP data can be displayed in different formats, and comprising:

a) displaying said DSP data in floating point format upon user selection, b) displaying said DSP data in decimal and hexadecimal formats upon user selection, c) displaying decimal and hexadecimal formats in single and double or multiple precision upon user selection, d) displaying double or multiple precision in little endian and big endian formats upon user selection.

16. The numeric intensive code development environment of claim 14, wherein said DSP data can be displayed in an M_N fractional format, and comprising:

a) selecting DSP data to be converted to fractional format, b) providing all combinations of M and N where M+N equals the maximum number of available bits of data of said fractional format, c) selecting N bits by the user to determine the fractional portion of the data to be displayed, d) converting DSP data to fractional format by dividing DSP data by the Nth power of 2, e) displaying DSP data in fractional format on computer display.

17. The numeric intensive code development environment of claim 14, wherein said DSP data can be converted to double precision little endian format, and comprising:

a) selecting four bytes of sixteen bit fixed point DSP data to be converted to little endian format and located in two contiguous DSP memory locations, b) selecting the two lower order bytes of the four bytes located in a memory address in the DSP, c) concatenating the second two bytes of DSP data to the lower order bytes to form a little endian formatted number, d) displaying the little endian formatted number on the computer display along with the DSP lower memory address.

18. The numeric intensive code development environment of claim 14, wherein said DSP data can be converted to double precision big endian format, and comprising:

a) selecting four bytes of sixteen bit fixed point DSP data to be converted to big endian format and located in two contiguous DSP memory locations, b) selecting the two higher order bytes of the four bytes located in a memory address in the DSP, c) concatenating the second two bytes of DSP data to the higher order bytes to form a big endian formatted number, d) displaying the big endian formatted number on the computer display along with the DSP higher memory address.

* * * * *